United States Patent [19]

Sawada

[11] 3,925,336

[45] Dec. 9, 1975

[54] PROCESS FOR PREPARING GRANULAR ETHYLENE-VINYL ALCOHOL COPOLYMER

[75] Inventor: Atsuo Sawada, Ogaki, Japan

[73] Assignee: Nippon Gohsei Kagaku Kogyo Kabushiki Kaisha, Osaka, Japan

[22] Filed: June 7, 1974

[21] Appl. No.: 477,419

[52] U.S. Cl. ............................ 260/87.3; 260/87.3 X
[51] Int. Cl.² .............. C08F 210/00; C08F 212/00; C08F 220/00; C08F 222/00
[58] Field of Search ................................. 260/87.3

[56] References Cited
UNITED STATES PATENTS

| | | | |
|---|---|---|---|
| 2,386,347 | 10/1945 | Roland | 260/87.3 X |
| 2,467,774 | 4/1949 | Plambeck, Jr. | 260/87.3 X |
| 3,344,129 | 9/1967 | Bestian et al. | 260/87.3 |
| 3,386,978 | 6/1968 | Salyer | 260/87.3 |
| 3,510,463 | 5/1970 | Bristol | 260/87.3 |
| 3,523,933 | 8/1970 | Inskip | 260/87.3 |
| 3,560,461 | 2/1971 | Yonezu et al. | 260/87.3 |
| 3,562,234 | 2/1971 | Resz et al. | 260/87.3 |

*Primary Examiner*—Joseph L. Schofer
*Assistant Examiner*—Herbert J. Lilling
*Attorney, Agent, or Firm*—Armstrong, Nikaido & Wegner

[57] ABSTRACT

Process for directly preparing a granular ethylene-vinyl alcohol copolymer having a uniform size and shape without crushing by hydrolyzing a lower alkyl alcohol solution of ethylene-vinyl acetate copolymer in a form of fine droplets suspended in a non-solvent to the extent that not less than 80% by mole of vinyl acetate component is hydrolyzed; said lower alkyl alcohol having 1 to 4 carbon atoms, said ethylene-vinyl acetate copolymer having an ethylene content of 5 to 85% by mole and a vinyl acetate content of 95 to 15% by mole, and said non-solvent being substantially incapable of dissolving the ethylene-vinyl acetate copolymer and the resulting ethylene-vinyl alcohol copolymer and immiscible with said lower alkyl acetate corresponding to said lower alkyl alcohol.

12 Claims, 1 Drawing Figure

U.S. Patent Dec. 9, 1975 3,925,336
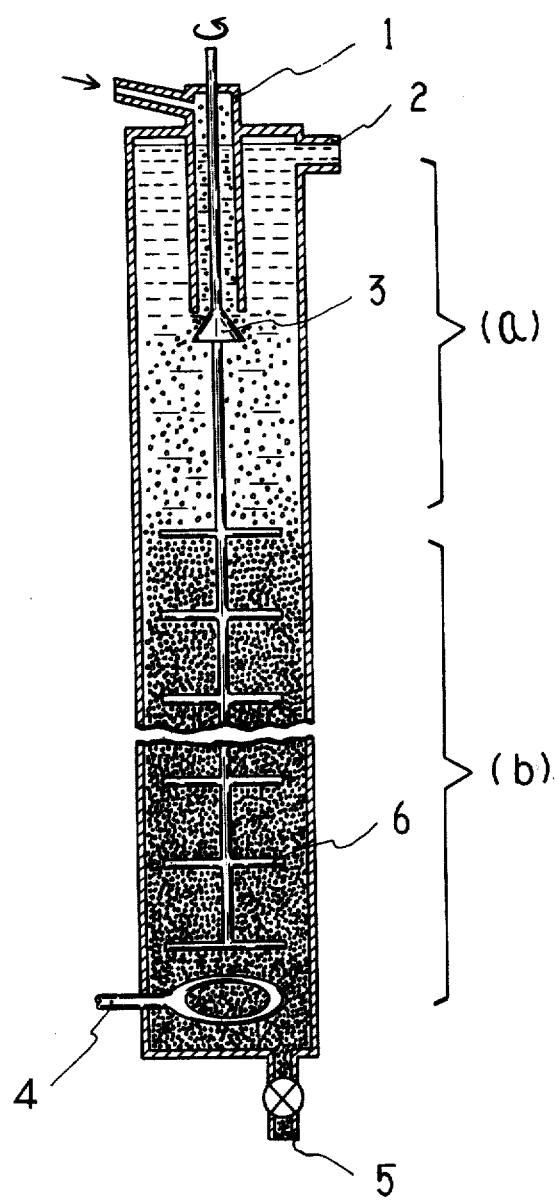

PROCESS FOR PREPARING GRANULAR ETHYLENE-VINYL ALCOHOL COPOLYMER

BACKGROUND OF THE INVENTION

The present invention relates to a process for preparing granular ethylene-vinyl alcohol copolymer, more particularly to a process for preparing granular ethylene-vinyl alcohol copolymer having a uniform size and shape without passing through a step of crushing.

It has been known that ethylene-vinyl alcohol copolymer is applied to uses such as fibers, films or coating materials. Since the copolymer is excellent in oil resistance, hardness and mechanical strength such as flexural strength and tensile strength, it is also applicable to the so-called engineering plastics such as various electric-device parts or machine parts by a known means such as injection molding, extrusion or compression molding.

When resin powders are processed in these fields, it has been often required that resin powders have a uniform size and shape. For instance, when resin powders are supplied to an extruder, it is necessary for a stable supply that the particle size of resin powders distributes within a certain range. Also, when resin powders are melt-coated by fluidized bed coating, a flow state of powders is remarkably influenced by a shape and size distribution of powders, and, therefore, it is desirable to be uniform in particle size and spherical.

Heretofore, as a process for preparing ethylene-vinyl alcohol copolymer, there has been known a process by subjecting an organic solvent solution or water dispersion of ethylene-vinyl acetate copolymer to hydrolysis in the presence of hydrolyzing catalyst such as acid or alkali with heating. According to a kind of organic solvent employed and a composition of the ethylene-vinyl acetate copolymer, the hydrolysis is completed homogeneously or heterogeneously. In the former case, ethylene-vinyl alcohol copolymer is precipitated by adding a non-solvent to the system. In the latter case, ethylene-vinyl alcohol copolymer is precipitated in the course of hydrolysis. In any case, the ethylene-vinyl alcohol copolymer obtained by such a process is in a form of block or flake, and the particle size and shape thereof are not uniform. Therefore, in order to make the particle size uniform, a crushing is essential. When powders prepared by a mechanical crushing are employed as a molding material or coating material, flowability of powders or uniformity of coated film are decreased since the powders are subjected to partial heating by friction heat during crushing and change in quality. Also, in such a conventional step for precipitating ethylene-vinyl alcohol copolymer or step for separating the precipitated copolymer from the reaction mixture and drying the copolymer, the operation is complicated and the complete precipitation is difficult due to the solubility of the copolymer, and particle size and shape are difficult to control since they greatly alter depending on a precipitating conditions.

OBJECTS OF THE INVENTION

It is an object of the present invention to provide granular ethylene-vinyl alcohol copolymer having a uniform size and shape.

A further object of the invention is to provide a process for preparing granular ethylene-vinyl alcohol copolymer having a uniform size and shape, which has no need of any mechanical crushing step.

Another object of the invention is to provide a process for preparing granular ethylene-vinyl alcohol copolymer of which procedures such as precipitation, separation and drying of granules are easier as compared with those of a conventional process.

These and other objects of the invention will become apparent from the description hereinafter.

BRIEF DESCRIPTION OF THE DRAWING

The accompanying drawing is a schematic view of an apparatus showing the way of washing the granules of ethylene-vinyl alcohol copolymer in the present invention.

DETAILED DESCRIPTION

It has now been found that the above-mentioned objects can be attained by a process which comprises, in preparing ethylene-vinyl alcohol copolymer by hydrolyzing ethylene-vinyl acetate copolymer in the presence of a hydrolyzing catalyst with agitation, carrying out the hydrolysis under suspending an alcohol solution of ethylene-vinyl acetate copolymer in a non-solvent substantially incapable of dissolving the ethylene-vinyl acetate copolymer and the resulting ethylene-vinyl alcohol copolymer, and immiscible with the lower alkyl alcohol and the lower alkyl acetate.

According to the present invention, there can be obtained granular ethylene-vinyl alcohol copolymer having a uniform size and being spherical without passing through a crushing step. Furthermore, the control of the particle size is easy, and the separation of granules from the reaction mixture, washing and drying are also easier than those in prior arts.

The term "ethylene-vinyl alcohol copolymer" as used herein means the hydrolyzed ethylene-vinyl acetate copolymer of which degree of hydrolysis in vinyl acetate component is not less than 80 % by mole.

Also the term "ethylene-vinyl acetate copolymer" as used herein comprehends containing further monomer copolymerizable with ethylene and vinyl acetate in which the ratio of further monomer to vinyl acetate is not more than 5 : 95 by mole.

In preparing the granular ethylene-vinyl alcohol copolymer according to the above-mentioned process, the greater the content of vinyl alcohol component in the copolymer, the stronger the formed granules have a tendency to agglutinate each other or adhere to a reaction vessel walls at the stage of the appearance of solid granules with a progress of the hydrolysis. Then, for the purpose of preventing the agglutination and making the hydrolysis proceed smoothly, it is further applicable in the above-mentioned process to add the specific amount of a lower alkyl acetate to the suspension at any time before the viscosity of the suspension begins to rise. In general, the viscosity of the suspension increases in the course of the hydrolysis before the solid granules of ethylene-vinyl alcohol copolymer appear in the suspension.

Moreover, thus prepared granule tends to include the non-solvent employed in the hydrolysis not only on the surface thereof but also in the inner parts thereof. When employed in the uses such as moldings or coating materials, such granules including the non-solvent cause the lowering of properties because the non-solvent breeds at the time of molding or coating. Therefore, it is necessary to remove the non-solvent from the granules.

As a way of removing the non-solvent from the granules, heat drying and washing with a miscible solvent are still insufficient. In the former case, it is impossible to remove the non-solvent included in the inner parts of the granule to the extent of a trace, and there is a possibility of change in quality of the copolymer by heating. In the latter case, namely a way of removing the non-solvent by adding the granular copolymer to a vessel filled with a washing solvent and agitating them, the non-solvent on the surface of the granules can be removed but the removement of the non-solvent included in the inner parts of the granule is very slow because it depends on only diffusion regardless of an agitating rate. Furthermore, in such a case, a washing accompanying a mechanical agitation has the disadvantages that a great deal of power is required and the efficiency of an apparatus is low.

In the present invention, the non-solvent can be efficiently removed from the granules of ethylene-vinyl alcohol copolymer by subjecting the granule suspension obtained by the hydrolysis contacting with a lower alkyl acetate in the way of counter current, wherein the granule suspension flows downward and the lower alkyl acetate flows upward and the granules fall spontaneously in the lower alkyl acetate.

According to the present invention, there can be obtained granules having a particle size within the range of 50 to 600 $\mu$ and being spherical. The particle size is mainly influenced by the viscosity of the alcohol solution of ethylene-vinyl acetate copolymer, the viscosity of the non-solvent and the rate of agitation. It is possible to prepare the granules having the desired particle size within the range of 50 to 600 $\mu$ by selecting these conditions.

The ethylene-vinyl acetate copolymers employed in the present invention are those containing 5 to 85 % by mole of ethylene and 95 to 15 % by mole of vinyl acetate. The copolymers containing 20 to 40 % by mole of ethylene and 80 to 60 % by mole of vinyl acetate are preferably employed. Also, there may be applicable to the present invention copolymers of 5 to 85 % by mole of ethylene and the balance of vinyl acetate and monomer copolymerizable with ethylene and vinyl acetate in which the ratio of the copolymerizable monomer to vinyl acetate is not more than 5 : 95 by mole. Examples of the monomer copolymerizable with ethylene and vinyl acetate are propylene, isobutylene, acrylic acid, crotonic acid, acrylic ester, methacrylic ester, and the like.

The ethylene-vinyl acetate copolymer employed in the present invention is selected from those having an intrinsic viscosity of 0.3 to 2.5 dl./g. in benzene solution at 30°C.

The ethylene-vinyl acetate copolymer is dissolved in a lower alkyl alcohol and is employed as an alcohol solution in concentration of not more than 50 % by weight, preferably in concentration of 25 to 40 % by weight. The lower alkyl alcohols in the present invention are those having 1 to 4 carbon atoms, such as methanol, ethanol, iso-propanol, n-butanol or tert-butanol. Especially methanol is most commonly employed but, when the ethylene-vinyl acetate copolymer having the ethylene content of not less than 40 % by mole is employed, it is desirable to employ methanol in combination with other alcohols, preferably in combination with tert-butanol because the solubility of the ethylene-vinyl acetate copolymer to methanol becomes poor. The ratio of methanol to tert-butanol is selected within the range of 2 : 8 to 8 : 2 by volume.

The alcohol solution of the ethylene-vinyl acetate copolymer may be suspended into the non-solvent by a way such as continuously or discontinuously introducing the alcohol solution in the non-solvent to a reaction vessel and agitating them vigorously, or rotating in the non-solvent a hollow cylindrical vessel having a great deal of small pore on its walls, which is charged with the alcohol solution, and dispersing the alcohol solution into the non-solvent through the small pores. The alcohol solution is suspended in the non-solvent preferably by introducing the alcohol solution to a reaction vessel with agitator and thereto adding the non-solvent and, after once allowing to stand, agitating them. In either case, it is suitable to previously admix a hydrolyzing catalyst with the alcohol solution. The ratio of the alcohol solution to the non-solvent is selected from the range of 1 : 1 to 1 : 20 by volume.

As a non-solvent, it is essential to be incapable of dissolving the ethylene-vinyl acetate copolymer and the ethylene-vinyl alcohol copolymer and to be immiscible with lower alkyl alcohols and lower alkyl acetates. Examples of the non-solvent are aliphatic saturated hydrocarbons, aromatic hydrocarbons, alicyclic hydrocarbons, and the mixtures thereof. Especially, liquid paraffin, kerosene and cyclohexane are preferably employed.

The hydrolysis is carried out in the presence of a hydrolyzing catalyst such as acid or alkali at a temperature of 20° to 60°C. Usually, a methanol solution of sodium hydroxide in a concentration of 1 to 4 % by weight is employed as the catalyst.

According to the present invention, though depending on the concentration of the alcohol solution and the state of suspension, the viscosity of the hydrolysis reaction system generally beings to rise when the hydrolysis proceeds to the extent of 40 to 60 % by mole in the degree of hydrolysis and thereafter it rises on with a progress of the hydrolysis and lowers about when the formation of granules completes. It is possible to trace the viscosity variation by recording a load on agitator. In case of carrying out the present invention in an industrial scale, the formed granules of ethylene-vinyl alcohol copolymer tend to agglutinate each other or adhere to a reaction vessel walls at the specific stage of the hydrolysis, especially after the viscosity begins to rise. The tendency is remarkable in the copolymer having the ethylene content of 20 to 40 % by mole. In such a case, the agglutination or the adhesion can be prevented by adding the specific amount of a lower alkyl acetate to the reaction system. The lower alkyl acetate must be added at the time the viscosity begins to rise or at any time prior to the beginning. The "at the time the viscosity begins to rise" does not means to limit the time for addition to a precise point the viscosity begins to rise, and a certain margin before and after the beginning is also allowable.

When the lower alkyl acetate is added at earlier time of the hydrolysis, the rate of hydrolysis tends to be inhibited. Therefore, in case of producing highly hydrolyzed ethylene-vinyl acetate copolymer, it is the most desirable to add the lower alkyl acetate at the time the viscosity begins to rise. However, at later time as when the viscosity has been rised and the suspended droplets of the alcohol solution begins to solidify, the agglutination or the adhesion can not be prevented.

The amount of lower alkyl acetate depends on the composition of the ethylene-vinyl acetate copolymer and the concentration of the alcohol solution, but usually selected from the range of not more than 100 % by weight to the lower alkyl alcohol in the reaction system. When the lower alkyl acetate is added in large quantity, as more than 100 % by weight, the efficiency of an apparatus tends to decrease though the effect of preventing the agglutination or the adhesion. Preferably, the amount is selected from the range of 5 to 50 % by weight to the lower alcohol in the system. Examples of the lower alkyl acetate are methyl acetate, ethyl acetate, propyl acetate, butyl acetate, and the like. According to the present invention, methyl acetate is most preferably employed in order to prevent the agglutination or the adhesion but there may be also employed a mixture of the lower alkyl acetate and a lower alkyl alcohol. A mixture of methyl acetate and methanol is preferably employed in consideration of the separation thereof from the formed granules.

The formed granules may be separated, washed and dried by a conventional procedure to recover the granules, but as mentioned before, such granules are liable to include the non-solvent employed in the hydrolysis. In order to remove the non-solvent completely, the formed granules are washed and recovered according to the present invention.

The process of washing the granules of ethylene-vinyl alcohol copolymer is described in detail with reference to the accompanying drawing. However, it is understood that the embodiment is not limited to that shown in the accompanying drawing and that various changes and modifications may be made without departing from the spirit and scope of the present invention.

Referring to the drawing showing a washing tower, the reaction mixture obtained by the hydrolysis is supplied from a feed pipe 1 placed at the top of a washing tower. The granules fall in the washing tower, on the other hand, a lower alkyl acetate as washing solvent supplied at a bottom region of the tower flows upward through the tower and flows over from an outlet 2 together with the liquids employed in the hydrolysis. Thus, a region of lower alkyl acetate is formed. In order to prevent an overflow of the granules from the outlet 2, a bottom end of the feed pipe 1 is preferably located at least near at a middle region of a solid-liquid separation portion (a). A member for dispersing the granules 3, as in cone or pyramid shape, may be suitably equipped in the region of the bottom end of the feed pipe 1 so as to make the granules fall uniformly. The supplied granules fall through the solid-liquid separation portion (a) and then through a washing portion (b) in contact with the lower alkyl acetate in counter current. The lower alkyl acetate is supplied from an inlet for lower alkyl acetates 4 equipped at the bottom region of the tower. In order to contact the granules with the lower alkyl acetate as intimately as possible, the inlet 4 is prepared with a pipe in ring shape, and at an under side of the pipe, many pores are provided. The numeral 5 is an outlet from which the granules are taken out. Instead of, or in combination with the ring pipe for the inlet 4, a dispersion plate may be equipped over the inlet 4. In such a case, the outlet 5 is placed at a side wall of the tower over the dispersion plate. So far as the granules are not flow backward in the washing portion (b), it is desirable to accelerate the contact of the granules with the lower alkyl acetate by very mild agitation. For that purpose, an agitator 6 equipped with round bar blades may be preferably provided.

The separation of the liquids employed in the hydrolysis from the granules is due to a difference between their specific gravity. The liquids are taken out of the outlet 2 and, on the other hand, the granules fall through the portion (a) and reach to the portion (b). The non-solvent attached on the surface of the granule is substantially removed at that stage. The granules are subjected to the counter-current contact with the lower alkyl acetate supplied from the inlet 4 and, by the time the granules reach to the tower bottom in the washing portion (b), the non-solvent included in the inner parts of the granules is removed almost to zero. A resistance time of the granules is usually several hours to 30 hours. Because the resistance time is long and a continuous operation is preferably carried out, the granules flow down with maintaining a piston flow without flowing backward in the washing portion (b). The washing portion (b) is filled with the granules and the lower alkyl acetate flows upward through between granules.

In order to maintain the piston flow of the granules, it is necessary to supply the lower alkyl acetate at a superficial velocity in the tower within the range of 0.001 to 0.06 time as fast as a terminal velocity of the granule falling in the portion (b). When the superficial velocity of the lower alkyl acetate is over the above range, the granules flow backward. On the other hand, when the superficial velocity is below the above range, a channelling of the lower alkyl acetate occurs. In either case, the washing efficiency lowers. The term "terminal velocity of the granule" as used herein means that calculated according to the following equation:

$$U_t = \left[ \frac{4}{225} \cdot \frac{(\rho_s - \rho_f)^2 g^2}{\mu \rho_f} \right]^{1/3} \cdot D$$

wherein $U_t$ is a terminal velocity of the granule, $\rho_s$ is a specific gravity of the granule, $\rho_f$ is an average specific gravity of the lower alkyl acetate employed as a washing solvent, $\mu$ is an average specific viscosity of the lower alkyl acetate and $D$ is an average particle size of the granule.

Examples of the lower alkyl acetate employed as a washing solvent are methyl acetate, ethyl acetate, propyl acetate, butyl acetate, and the like. Methyl acetate is most preferably employed. The lower alkyl acetate can be employed alone, or in a mixture thereof, or in combination with lower alkyl alcohols. It is industrially advantageous to employ the mixture of the lower alkyl acetates and the corresponding lower alkyl alcohol recovered from the hydrolyzed reaction mixture.

The present invention is more particularly described and explained by means of the following illustrating Examples.

Example 1

A flask equipped with an agitator was charged with 100 parts of 40 % methanol solution of ethylene-vinyl acetate copolymer having an ethylene content of 30 % by mole and 10 parts of 3.5 % methanol solution of sodium hydroxide, and thereto 100 parts of liquid paraffin was gently added along with the flask wall. After allowing to stand so as to form two separate layers, the hydrolysis was carried out at a temperature of 40°C. with agitation. At 20 minutes later from the initiation of the hydrolysis, the viscosity of the reaction mixture began to rise, and for further 2 hours the hydrolysis is continued to give granules of hydrolyzed ethylene-vinyl acetate copolymer having 95 % by mole of a degree of hydrolysis in vinyl acetate component.

The granules were separated by filtration, washed with a mixture of methyl acetate and methanol (1 : 1), and then air-dried at room temperature. Thus obtained ethylene-vinyl alcohol copolymer was granule in the form of pearl having an average particle size of 200 $\mu$, and of which 84 % was present within the range of 297 to 177 $\mu$ in particle size, but the granules partially agglutinated each other.

Example 2

The same procedure as in Example 1 was repeated except that 20 parts of methyl acetate and 5 parts of 3.5 % methanol solution of sodium hydroxide were added to the reaction system when the viscosity of the system began to rise (20 minutes later from the initiation of the hydrolysis).

The obtained ethylene-vinyl acetate copolymer was granule in the form of pearl having an average particle size of 200 $\mu$, and of which 86 % was present within the range of 297 to 177 $\mu$ in particle size. The degree of hydrolysis of the obtained granules was 95 % by mole. There was no agglutination and ahesion to the flask walls of the granules.

Example 3

A flask equipped with an agitator was charged with 100 parts of 50 % methanolic solution of ethylene-vinyl acetate copolymer having an ethylene content of 35 % by mole, 20 parts of 3.5 % methanolic solution of sodium hydroxide and 20 parts of methyl acetate, and thereto 120 parts of liquid paraffin was further added gently. Then, the hydrolysis was carried out at a temperature of 40°C. for 3 hours with agitation to give granules.

The obtained granules were in the form of pearl, as those obtained in Example 2. Also, there were not observed the agglutination between granules and the adhesion to the flask walls.

Example 4

The same procedure as in Example 1 was repeated except that ethylene-vinyl acetate copolymer having an ethylene content of 75 % by mole and an equivolume mixture of methanol and tert-butanol were employed instead of the copolymer having an ethylene content of 30 % by mole and methanol.

The degree of hydrolysis (of the obtained ethylene-vinyl alcohol copolymer) was 85 % by mole, and the average particle size of the granule was 150 $\mu$.

Example 5

From an inlet at the top of a cylindrical washing tower having a diamater of 300 mm. and a high of 3,500 mm., a hydrolysis reaction mixture including granules of hydrolyzed ethylene-vinyl acetate copolymer having an ethylene content of 30 % by mole (Average particle size of the granule: 420 $\mu$, Degree of hydrolysis in vinyl acetate component: 95.0 % by mole, Amount of granules: 14 % by weight to the suspension, non-solvent: liquid paraffin having a specific gravity of 0.86), which was obtained by the same manner as in Example 1, was supplied to the tower at a rate of 24 kg. per hour. On the other hand, a washing solvent consisting of 80 % by weight of methyl acetate and 20 % by weight of methanol was supplied at a rate of 28 kg. per hour from an inlet at the bottom of the tower. The superficial velocity in the tower of the washing was $6.57 \times 10^{-5}$ m./sec. The exhaust amount of the granules was controlled so that the residence time of the granules was 13 hours, and the terminal velocity of the granules at this time was $3.06 \times 10^{-2}$ m./sec. The ratio of the superficial velocity of the washing solvent to the terminal velocity of the granule was 0.00215 : 1. The granules were exhausted from an outlet at the bottom of the tower as slurry including granules in concentration of 20 % by weight. The amount of the granules so exhausted was 3.36 kg. per hour. Thus washed and recovered granule included 50 p.p.m. of the non-solvent.

The same procedures as in the above were repeated except that the washing solvent was supplied at a rate of 19.5 kg. per hour (the superficial velocity in the tower:$2.75 \times 10^{-5}$ m./sec.) or at a rate of 453.4 kg. per hour (the superficial velocity in the tower: $1.98 \times 10^{-3}$ m./sec.), respectively. The non-solvent content of the granule was 1,500 p.p.m. or 4,900 p.p.m., respectively.

Examples 6 and 7

The same procedures as in Example 3 were repeated except that ethylene-vinyl acetate copolymers of which ethylene contents were 10 % by mole (Example 6) and 40 % by mole (Example 7) were employed.

What is claimed is:

1. In a process for preparing ethylene-vinyl alcohol copolymer by hydrolyzing ethylene-vinyl acetate copolymer in the presence of a hydrolyzing catalyst, the improvement which comprises
    a. forming a solution containing a lower alkyl alcohol having 1 to 4 carbon atoms and an ethylene-vinyl acetate copolymer, said copolymer having an ethylene content of 5 to 85% by mole and a vinyl acetate content of 95 to 15% by mole,
    b. suspending the solution in a non-solvent which is substantially incapable of dissolving the ethylene-vinyl acetate copolymer and the ethylene-vinyl alcohol copolymer and is immiscible with the lower alkyl alcohol and lower alkyl acetate corresponding to the lower alkyl alcohol,
    c. mixing together the solution and non-solvent in the presence of a hydrolyzing catalyst at a temperature in the range frorm 20° to 60°C such that not less than 80% by mole of the vinyl acetate is hydrolyzed to form ethylene-vinyl alcohol copolymer granules, and
    d. separating the granules from the solution-non-solvent mixture said granular ethylene-vinyl alcohol copolymer having a uniform size and being spherical without the need for employing a crushing step.

2. The process of claim 1, wherein said lower alkyl alcohol is methanol.

3. The process of claim 1, wherein a concentration of said solution of ethylene-vinyl acetate copolymer is not more than 50 % by weight.

4. The process of claim 1, wherein said non-solvent is liquid paraffin.

5. The process of claim 1, wherein said solution is suspended in said non-solvent at the ratio of the solution to the non-solvent within the range of 1 : 1 to 1 : 20 by volume.

6. The proccess of claim 1, in which a lower alkyl acetate having an alkyl group of 1 to 4 carbon atoms is added to the reaction mixture in an amount of not more than 100 % by weight to said lower alkyl alcohol in the reaction mixture at the time the viscosity of said suspension begins to rise.

7. The process of claim 6, wherein said lower alkyl acetate is added in an amount of 5 to 50 % by weight to said lower alkyl alcohol.

8. The process of claim 6, wherein said lower alkyl acetate is methyl acetate.

9. The process of claim 1 wherein the granules are washed by contacting the granules with a washing solution containing a lower alkyl acetate, wherein the lower alkyl groups have from 1 to 4 carbon atoms.

10. The process of claim 9, wherein said lower alkyl acetate is methyl acetate.

11. The process of claim 1, wherein said solution is a methanol solution of ethylene-vinyl acetate copolymer having an ethylene content of 5 to 40 % by mole and a vinyl acetate content of 95 to 60 % by mole.

12. The process of claim 1, wherein said solution is a methanol-tert-butanol solution of ethylene-vinyl acetate copolymer having an ethylene content of 40 to 85 % by mole a vinyl acetate content of 60 to 15 % by mole.

* * * * *